United States Patent

Kombowski et al.

(10) Patent No.: US 8,251,193 B2
(45) Date of Patent: Aug. 28, 2012

(54) TORQUE TRANSMISSION DEVICE

(75) Inventors: Eugen Kombowski, Buehl (DE);
Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 413 days.

(21) Appl. No.: 12/472,533

(22) Filed: May 27, 2009

(65) Prior Publication Data

US 2009/0229938 A1 Sep. 17, 2009

Related U.S. Application Data

(63) Continuation of application No. PCT/DE2007/002047, filed on Nov. 13, 2007.

(30) Foreign Application Priority Data

Nov. 29, 2006 (DE) .......................... 10 2006 056 294

(51) Int. Cl.
*F16H 45/02* (2006.01)
(52) U.S. Cl. ..................................... 192/3.29; 192/70.18
(58) Field of Classification Search .................... 464/69, 464/84
See application file for complete search history.

(56) References Cited

U.S. PATENT DOCUMENTS

| 5,383,540 | A | * | 1/1995 | MacDonald | ................. 192/3.29 |
| 6,640,945 | B2 | | 11/2003 | Arhab et al. | |
| 6,938,744 | B2 | | 9/2005 | Tomiyama | |
| 2004/0216972 | A1 | * | 11/2004 | Tomiyama | ................... 192/3.29 |

FOREIGN PATENT DOCUMENTS

| DE | 10342035 A1 | 4/2004 |
| JP | 2004144186 A | 5/2004 |
| WO | WO 02/01092 A1 | 1/2002 |

* cited by examiner

*Primary Examiner* — Rodney Bonck
(74) *Attorney, Agent, or Firm* — Simpson & Simpson, PLLC

(57) ABSTRACT

A torque transmission device, in particular in the drive train of a motor vehicle, with a hydrodynamic torque converter (6), including a converter cover (14), which can be connected torque proof or is connected torque proof with a drive unit (3). The converter cover can be coupled with a turbine shell (21) through a pump shell (20), which can be bridged by a converter lockup clutch (30) that includes a piston (28) axially movable relative to the converter cover (14) within limits. The piston (28) is connected torque proof with a drive plate (50) in a first connection portion (51). The drive plate is connected torque proof with the converter cover (14) in a second connection portion (52), wherein an additional connection portion (53; 56) is provided, in which the drive plate (50) is connected torque proof with the converter cover (14).

2 Claims, 4 Drawing Sheets

TORQUE TRANSMISSION DEVICE

CROSS-REFERENCE TO RELATED APPLICATIONS

This application is filed under 35 U.S.C. §120 and §365(c) as a continuation of International Patent Application PCT/DE2007/002047, filed Nov. 13, 2007, which application claims priority from German Patent Application No. 10 2006 056 294.1, filed Nov. 29, 2006, which applications are incorporated herein by reference in their entirety.

FIELD OF THE INVENTION

The invention relates to a torque transmission device, in particular in the drive train of a motor vehicle, with a hydrodynamic torque converter, which comprises a converter cover, which can be connected torque proof to a drive unit or which is connected torque proof to said drive unit, which converter cover can be coupled through a pump shell to a turbine shell, which turbine shell can be bridged by a converter lockup clutch, which comprises a piston, which can be axially moved relative to the converter cover within limits.

BRIEF SUMMARY OF THE INVENTION

It is the object of the invention to provide a torque transmission for the drive train of a motor vehicle with a hydrodynamic torque converter, which is simple in construction and which can be produced at competitive cost.

The object is accomplished in a torque transmission device, in particular in the drive train of a motor vehicle, with a hydrodynamic torque converter, which comprises a converter cover, which can be connected or is connected torque proof to a drive unit, which converter cover can be coupled through a pump shell with a turbine shell which can be bridged by a converter lockup clutch which comprises a piston which can be axially moved relative to the converter cover within limits, in that the piston is connected torque proof with a drive disk in a first connection portion, which drive disk is connected torque proof with the converter cover in a second connection portion, wherein an additional connection portion is provided in which the drive disk is connected to the converter cover torque proof. The additional connection portion has the advantage that the torque to be transmitted can be distributed, so that the first and/or second connection portion is/are unloaded.

A preferred embodiment of the torque transfer device is characterized in that the additional connection portion is disposed in radial direction between the first and the second connection portion. The additional connection portion, however, can also be disposed radially within the second connection portion. The additional connection portion can be disposed axially overlapping with the first and/or the second connection portion. The additional connection portion, however, can also be disposed offset in axial direction relative to the first and/or the second connection portion.

Another preferred embodiment of the torque transmission device is characterized in that the additional connection portion is disposed in axial direction at least partially between the piston and the converter cover. This causes the additional connection portion to be at least partially covered by the piston. According to an essential aspect of the invention, the torque proof connection can be created quasi blind in the additional connection portion between the drive disk and the converter cover, this means, without the additional connection portion being visible to an assembly technician.

Another preferred embodiment of the torque transmission device is characterized in that the drive plate is connected form locked to the converter cover in the additional connection portion. The form locked connection is created quasi blind when the piston is assembled with the drive disk connected thereto.

Another preferred embodiment of the torque transmission device is characterized in that at least one form locking element is provided in the additional connection portion, which form locking element engages an opening in order to connect the drive disk with the converter cover torque proof. Preferably, plural form locking elements are provided, which engage complementary openings.

Another preferred embodiment of the torque transmission device is characterized in that the form locking element extends at least partially in axial direction. The form locking element either extends from the converter cover to the drive disk or vice versa from the drive disk to the converter cover.

Another preferred embodiment of the torque transmission device is characterized in that the form locking element is formed by a bud which is pressed out of the converter cover and which engages a pass-through hole which is recessed in the drive disk. On the other hand, the bud can also be pressed out of the drive disk, and it can engage a pass-through hole, which is recessed in the converter cover.

Another preferred embodiment of the torque transmission device is characterized in that the form locking element comprises a rise, a bridge, an ear, a concave bead or a convex bead, which protrudes from the drive disk in axial direction and which engages an indentation or a pass-through hole of the converter cover.

Another preferred embodiment of the torque transmission device is characterized in that the form locking element comprises a rise, a bridge, an ear, a bead or a lug, which protrudes from the converter cover in axial direction and which engages an indentation or a pass-through hole of the drive disk. The drive disk and/or the converter cover are preferably configured as sheet metal components.

Another preferred embodiment of the torque transmission device is characterized in that the additional connection portion or an additional connection portion is radially disposed within the piston. Thus, the other connection portions can be unloaded further.

Another preferred embodiment of the torque transmission device is characterized in that leaf spring tongues extend from the drive disk, which are mounted at the converter cover in the first connection portion. Mounting the leaf spring tongues at the converter cover is preferably performed by rivet connections.

Another preferred embodiment of the torque transmission device is characterized in that the leaf spring tongues extend on the radial outside from the drive disk. The leaf spring tongues are preferably provided with at least one pass-through hole for passing a mounting element through.

Another preferred embodiment of the torque transmission device is characterized in that the leaf spring tongues extend in circumferential direction. The leaf spring tongues preferably have the configuration of circular arcs.

BRIEF DESCRIPTION OF THE SEVERAL VIEWS OF THE DRAWING

Other advantages, features and details of the invention can be derived from the subsequent description, in which embodiments are described with reference to the drawing figures, wherein.

DETAILED DESCRIPTION OF THE INVENTION

Figure 1:
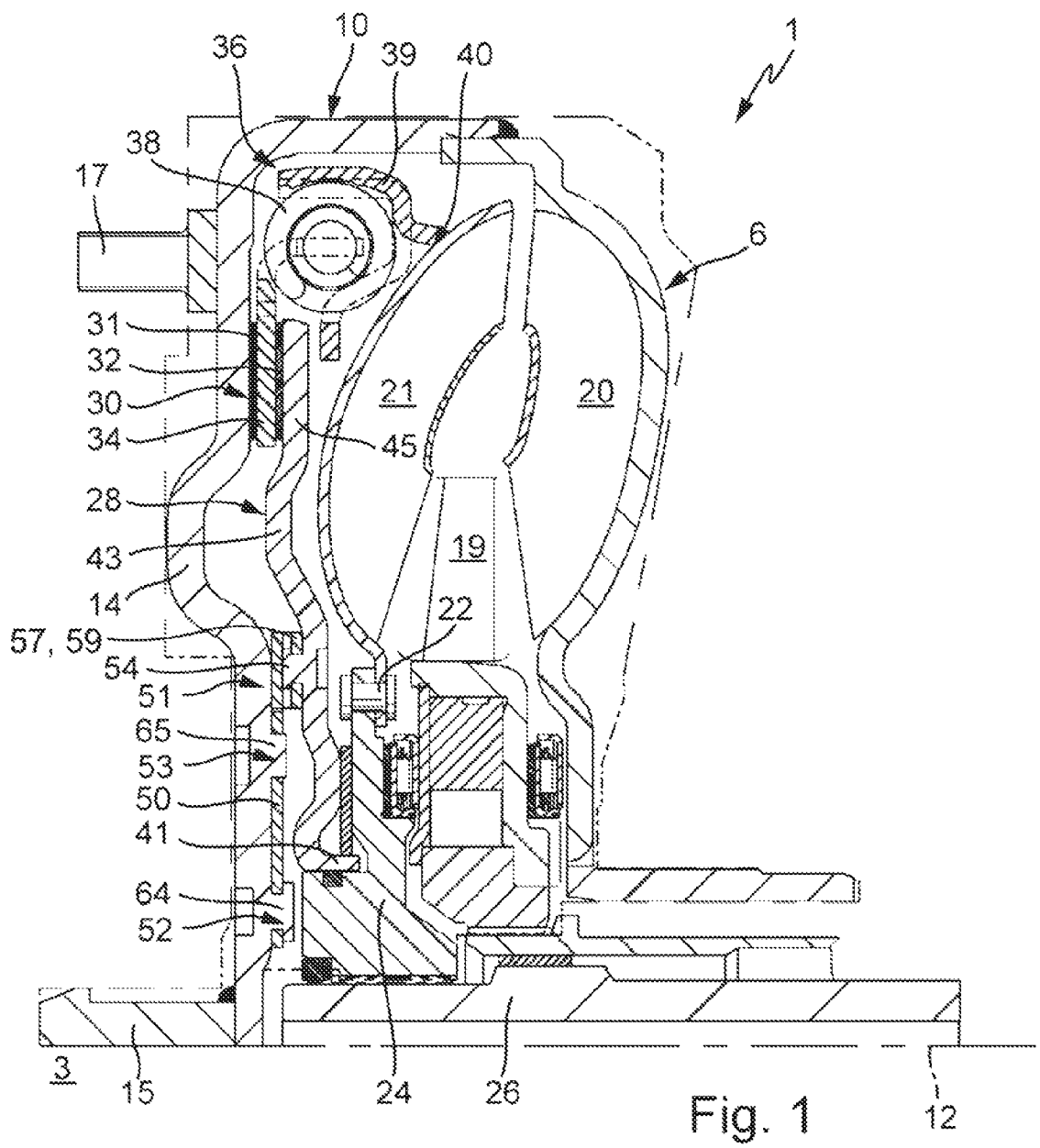
FIG. 1 shows a torque transmission device according to the invention in the drive train of a motor vehicle in a semi-sectional view.

FIG. 1 shows a portion of a drive train of a motor vehicle with a torque transmission device 1 according to the invention in a semi-sectional view. A hydrodynamic torque converter 6 is disposed between a drive unit 3, which is only indicated, in particular an internal combustion engine from which a crank shaft extends, and a transmission 5, which is also only indicated. The crankshaft of the drive unit 3 is connected to a housing 10 of the torque converter 6, e.g. by a drive plate which is also designated as flex plate.

The housing 10 of the torque converter 6 is rotatable about a rotation axis 12 and configured with a housing wall 14 proximal to the drive, which housing wall is also designated as converter cover. A central pilot boss 15 is attached to the converter cover 14, which pilot boss is used to pre-center the hydrodynamic torque converter 6 in a central recess of the crank shaft during assembly. Threaded bolts 17 are mounted at the converter cover 14 on the radial outside, which threaded bolts extend from the converter cover 14 in axial direction, this means in parallel to the rotation axis 12. The threaded bolt 17 is used for connecting the converter cover to the drive plate to the crank shaft.

The hydrodynamic torque converter 6 comprises a stator shell 19, a pump shell 20, and a turbine shell 21. The turbine shell 21 is attached at its radial inside through rivet connection elements 22 to a hub 24 at its radial inside. The hub 24 is connected with a transmission input shaft 26 torque proof, e.g. through respective teethings. During operation of the hydrodynamic torque converter 6, the motion energy of an oil flow is converted into a rotation force. Thus, the turbine shell 21 transfers motion energy through the hub 24 to the transmission input shaft 26. The stator shell 19 is provided with a one way clutch and guides the oil flow onto the pump shell 20 at a favorable angle.

A piston 28 of the converter lockup clutch 30 is disposed in axial direction between the converter cover 14 and the turbine shell 21. The converter lockup clutch 30 establishes a mechanical connection between the pump shell 20 and the turbine shell 21 in closed condition. The converter lockup clutch 30 comprises friction liners 31, 32, which are attached at an output component 34 of a torsion vibration damper 36. The output component 34 of the torsion vibration damper 36 is coupled to an input component 39 with spring elements 38 connected in between. The input component 39 of the torsion vibration damper 36 is attached at the turbine shell 21 through a welded connection 40.

The piston 28 of the converter lockup clutch 30 comprises an axially extending collar 41 on the radial inside, wherein the piston 28 is supported movable in axial direction on the hub 24. A connection disk 43 of the piston 28 extends in radially outward direction from the collar 41. The collar 41 is integrally connected through the connection disk 43 with a coupling ring 45 of the piston 28. The coupling ring 45 contacts the friction liner 32, which is disposed in axial direction between the output component 34 and the coupling ring 45. The friction liner 31 is disposed in axial direction between the output component 34 of the torsion vibration damper 36 and the converter cover 14. The piston 28 is hydraulically actuated. When the piston 28 is hydraulically actuated, the coupling ring 45 moves in axial direction towards the converter cover 14, so that the output component 34 with the friction liners 31, 32 is clamped between the coupling ring 45 of the piston 28 and the converter cover 14. Then the converter lockup clutch 30 is closed.

The piston 28 of the converter lockup clutch 30 is connected torque proof with a drive disk 50 in a first connection portion 51. The first connection portion 51 comprises a rivet circle, in which the piston 28 is connected torque proof with the drive disk 50, which is also designated as drive plate. Radially within the first connection portion 51, a second connection portion 52 is provided, in which the drive plate 50 is mounted at an inner rivet circle by means of rivet connection elements at the converter cover 14. The term radial direction relates to the rotation axis 12 in the context of the present invention. An addition connection portion 53 is provided in radial direction between the first connection portion 51 and the second connection portion 52. In the additional connection portion 53, the drive disk 50 is connected torque proof with the converter cover 14. The connection in the additional connection portion 53 is preferably configured as plug-in connection, which can be configured blind in axial direction.

Figure 2:
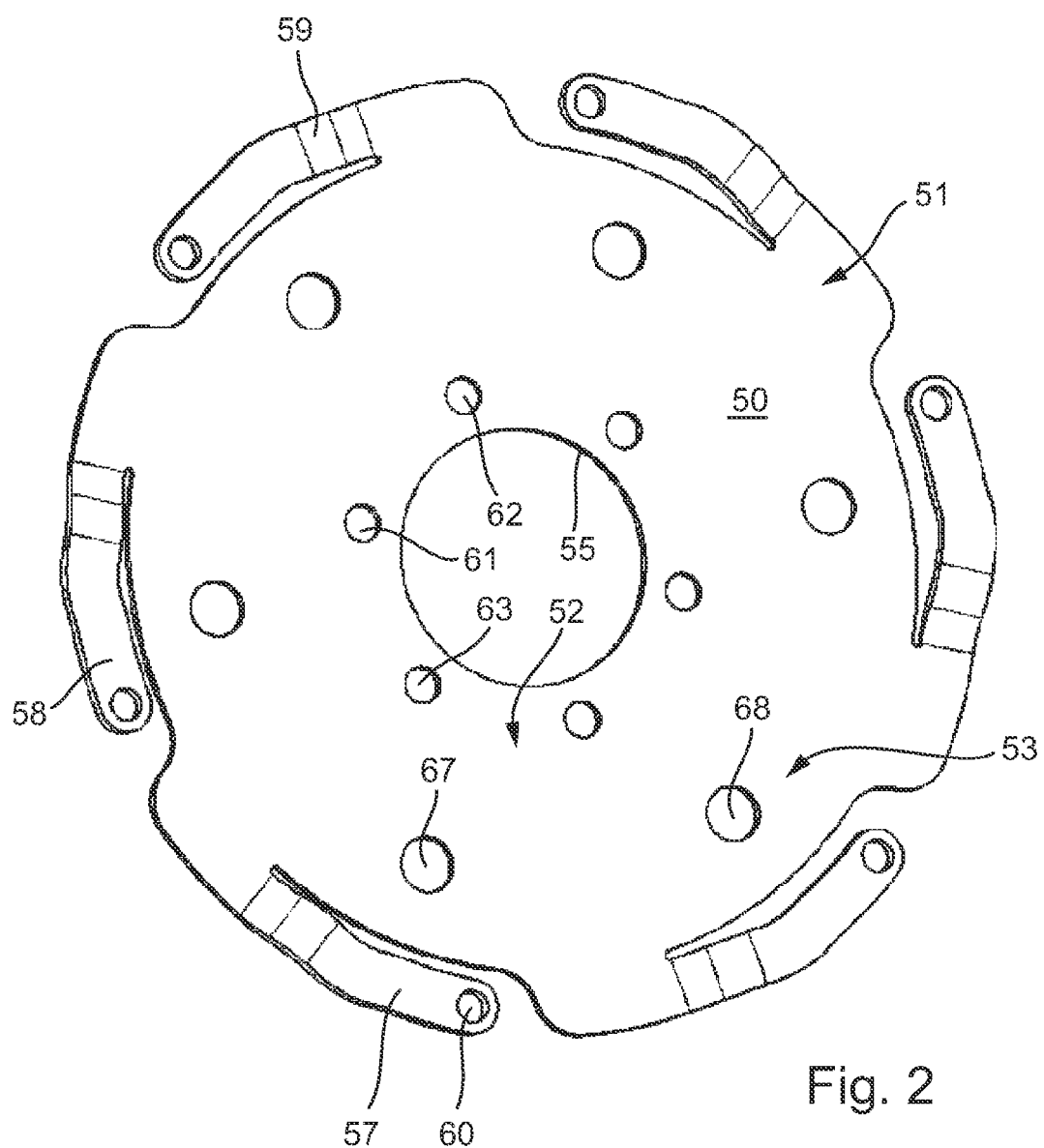
FIG. 2 shows a perspective illustration of a drive disk of the torque transmission device of FIG. 1.

FIG. 2 illustrates the drive disk 50 of FIG. 1 in a perspective view. The drive disk 50 is preferably configured as sheet metal component and is thus also designated as drive plate 50. The drive disk 50 comprises a central pass-through hole 55. Spring tongues 57, 58, 59 are disposed on the radial outside at the drive plate 50. The spring tongues 57-59 are integrally connected to the drive disk 50 and extend in circumferential direction. A respective pass-through hole 60 is cut out at the free ends of the spring tongues 55-59. The pass-through hole 60 is used for passing a rivet bud through, which is designated as 54 in FIG. 1. The rivet bud 54 is pressed out of the piston 28 and extends through the pass-through hole 60 in the spring tongue 57. The head of the rivet bud 54, which head protrudes from the pass-through hole 60 is riveted to the spring tongue 57, so that an axial movement of the piston 28 is facilitated relative to the drive disk 50. The spring tongues 57-59 are disposed in the first connection portion 51.

The drive disk 50 comprises further pass-through holes 61-63 in the second connection portion 52. The pass-through holes 60-61 are used for passing rivet connection elements through, which are designated as 64 in FIG. 1. FIG. 1 shows that the rivet connection element 64 is a rivet bud, which is pressed out of the converter cover 14. By means of the rivet buds 64, of which only one is shown in sectional view in FIG. 1, the drive plate 50 is connected to the converter cover 14 in the second connection portion 52.

In the additional connection portion 53, which is also designated as third connection portion 53, a form locking element 65 extends into a pass-through hole, which is recessed in the third connection portion 53 in the drive disk 50. It is evident in FIG. 2 that plural pass-through holes 67, 68 are disposed evenly distributed over a circumference of the drive disk 50 in the additional connection portion 53. Through form locking elements 65 engaging the pass-through holes 67, 68, which are e.g. pressed out of the converter cover in the form of rivet buds, an axial plug-in connection between the drive disk 50 and the converter cover 14 is facilitated. Through the additional connection in the additional connection portion 53, the connections at the inner bore hole circle in the second connection portion can be unloaded.

The assembly of the torque transmission device 1 illustrated in FIG. 1 is performed as follows: initially the drive disk 50 is connected to the piston 28 in the first connection portion 51 by means of riveting at the outer rivet circle. Said assembly is subsequently inserted into the converter cover 14 and connected to the converter cover 14 at the inner rivet circle of the drive disk 50 in the second connection portion 52 through the central opening, which is defined by the collar 41 of the piston 28. The rivet buds 64 provided at the converter cover 14 are used for this purpose. The diameter of the opening in the piston 28 has to be kept as small as possible, since a large opening negatively affects the necessary contact pressure, this means, the internal pressure in the converter. A large opening leads to a smaller effective piston surface, which in turn leads to a higher contact pressure. A smaller opening in the piston, however, also means a smaller rivet circle diameter for the connection of the drive disk 50 to the converter cover 14. Here, an impermissibly high bearing stress could occur at the rivet shafts.

According to an essential aspect of the present invention, an additional connection between the drive disk 50 and the converter cover 14 is provided in the additional connection portion 53. The additional connection elements in the additional connection portion 53 generate an additional form locked connection during assembly and are joined quasi blind. The torque to be transmitted thus does not have to be received entirely by the inner rivet circle in second connection portion 52, but it is also distributed over the additional connection elements in the additional connection portion 53. The additional connection elements can e.g. be rivet buds, beads, ears, etc. Different embodiments for configuring the additional connection portion 53 are shown in detail in the semi-sectional views in FIGS. 3-7.

Figure 3:
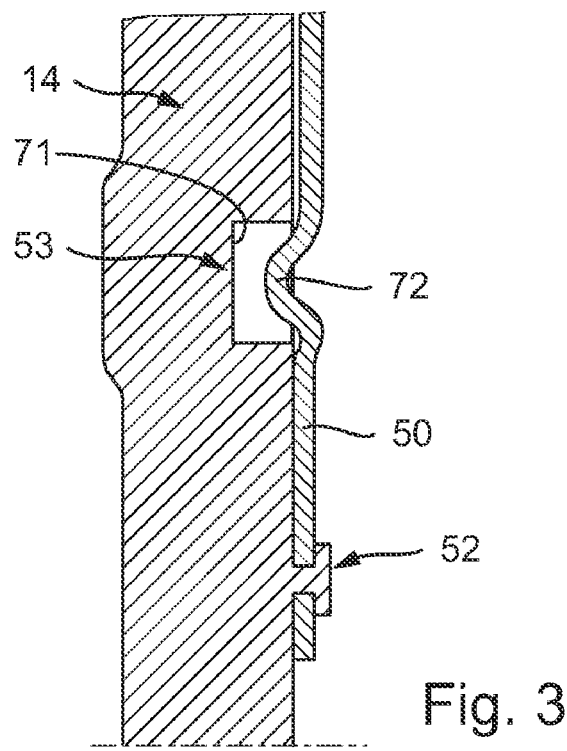
FIGS. 3-7 respectively show a detail of FIG. 1 according to different embodiments.

In the embodiment illustrated in FIG. 3, the converter cover 14 comprises an indentation 71, into which a rise 72 engages, which is formed from the drive disk 50 as a bead.

Figure 4:
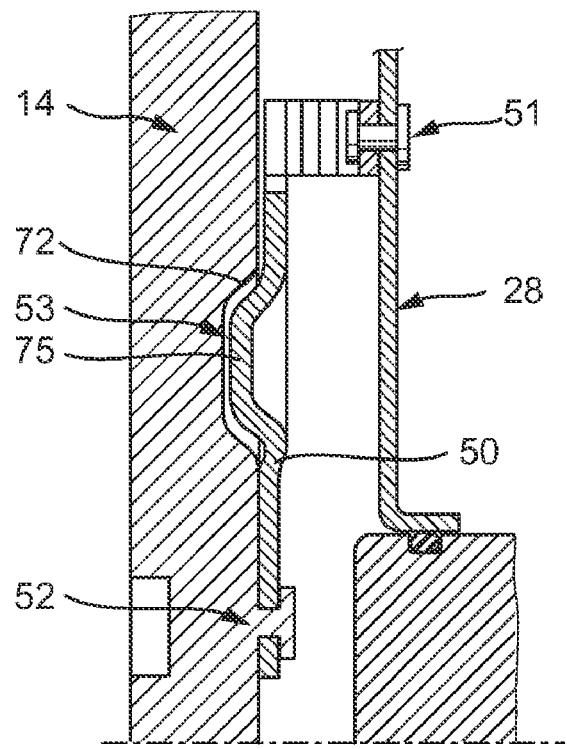

In the embodiment illustrated in FIG. 4, the converter cover 14 comprises an indentation 74, into which a rise 75 engages, which is configured at the drive plate 50. The rise 75 is formed by a bar, which is pressed out of the drive plate 50.

Figure 5:
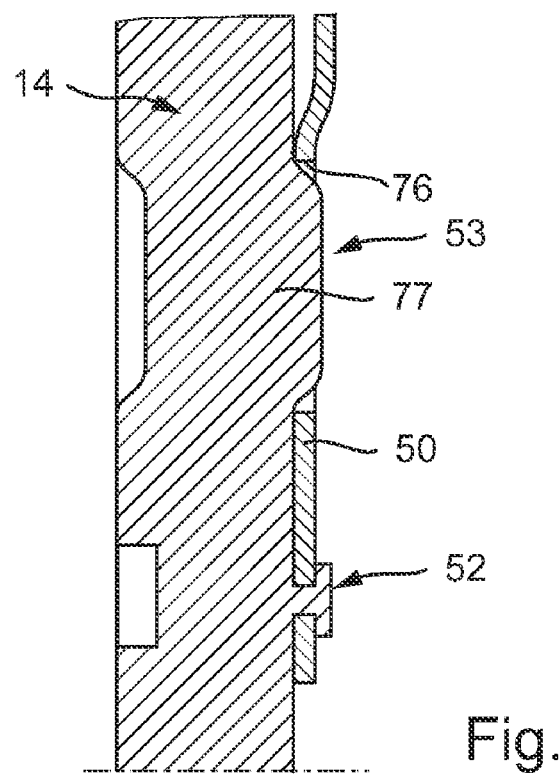

In the embodiment illustrated in FIG. 5, the converter cover 14 comprises a rise 77, which is pressed out of the converter cover 14. The rise 77 engages a pass-through hole 76, which is provided in the drive disk 50.

Figure 6:
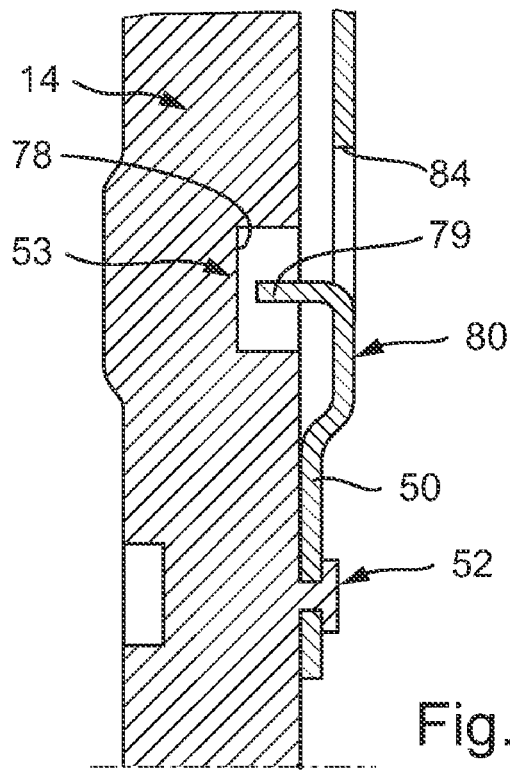

In the embodiment illustrated in FIG. 6, the converter cover 14 comprises an indentation 78, into which a bent over end 79 of an ear 80 protrudes. The ear 80 is provided in the portion of a recess 84 of the drive disk 50.

Figure 7:
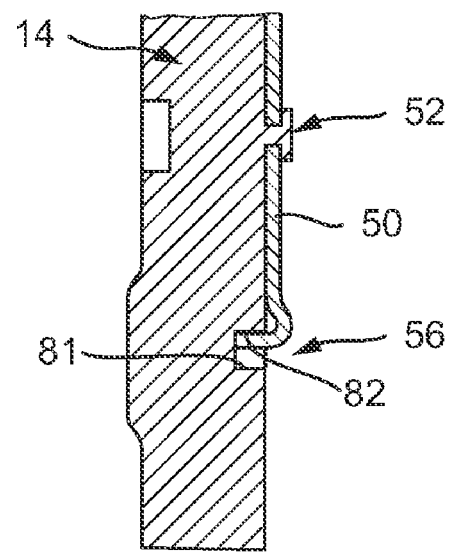

In the embodiment illustrated in FIG. 7, the drive disk 50 comprises a bent over drive tongue 82 radially within the second connection portion 52, which drive tongue engages an indentation 81, which is provided in the converter cover 14. The drive tongue 82 engaging the indentation 81 provides an additional connection portion 56 alternatively, or in addition to the third connection portion 53.

Installation space at the outer piston diameter can be saved through the drive disk 50 configured according to the invention. The reliability of the torque proof connection between the drive plate 50 and the converter cover 14 can be increased through the additional connection portion 53 or through the further connection portion 56. The installation space saved can e.g. be used for an engineering improvement of the converter lockup clutch. This is advantageous in particular for applications with highly limited installation space, but also for other applications. The present invention generally helps to avoid damages and assures the function of the converter lockup clutches under torques within the specification of the system.

REFERENCE NUMERALS AND DESIGNATIONS

1 torque transmission device
3 drive unit
5 transmission
6 hydrodynamic torque converter
10 housing
12 rotation axis
14 converter cover
15 pilot boss
17 threaded bolt
19 stator shell
20 pump shell
21 turbine shell
22 rivet connection element
24 hub
26 transmission input shaft
28 piston
30 converter lockup clutch
31 friction liner
32 friction liner
34 output component
36 torsion vibration damper
38 spring element
39 input component
40 weld joint
41 collar
43 connection disk
45 coupling ring
50 drive disk
51 first connection portion
52 second connection portion
53 additional connection portion
54 rivet bud
55 pass-through hole
56 connection portion
57 spring tongue
58 spring tongue
59 spring tongue
60 pass-through hole
61 pass-through hole
62 pass-through hole
63 pass-through hole
64 rivet connection element
65 form locking element
67 pass-through hole
68 pass-through hole
71 indentation
72 rise
74 indentation
75 rise
76 pass-through hole
77 rise
78 indentation
79 bent over end
80 ear
81 indentation
82 drive tongue
84 recess

What we claim is:

1. A torque transmission device, in particular in the drive train of a motor vehicle, with a hydrodynamic torque converter (6), comprising a converter cover (14), said converter cover connected torque proof with a drive unit (3), wherein said converter cover is coupled with a turbine shell (21) through a pump shell (20), bridged by a converter lockup clutch (30), which comprises a piston (28), which is axially movable relative to the converter cover (14) within limits, wherein the piston (28) is connected torque proof with a drive plate (50) in a first connection portion (51), which drive plate is connected torque proof with the converter cover (14) in a second connection portion (52), wherein an additional connection portion (53; 56) is provided, in which the drive plate (50) is connected torque proof with the converter cover (14);

wherein the additional connection portion (53) is disposed in radial direction between the first connection portion (51) and the second connection portion (52);

wherein the additional connection portion (53) is disposed in axial direction at least partially between the piston (28) and the converter cover (14) and, wherein leaf spring tongues (57, 59) extend from the drive plate (50), which said leaf spring tongues are connected to the converter cover (14) in the first connection portion (51).

2. A torque transmission device according to claim 1, wherein the leaf spring tongues (57-59) extend in circumferential direction.

\* \* \* \* \*